ADJUSTABLE ATTENUATION EQUALIZER

Filed April 19, 1962 2 Sheets-Sheet 1

INVENTORS
Jose L. Herrero
Gideon Willoner
Robert L. Weeks
BY
C. A. [signature]
Atty.

ADJUSTABLE ATTENUATION EQUALIZER

Filed April 19, 1962 2 Sheets-Sheet 2

INVENTOR.
Jose L. Herrero
Gideon Willoner
Robert L. Weeks
BY
C. A. Sullivan
Atty.

3,193,775

ADJUSTABLE ATTENUATION EQUALIZER

Jose Luis Herrero, San Carlos, Calif., and Gideon Willoner and Robert Lawrence Weeks, North Vancouver, British Columbia, Canada, assignors to Lenkurt Electric Co. of Canada, Ltd., Vancouver, British Columbia, Canada, a corporation of Canada Filed Apr. 19, 1962, Ser. No. 188,819
5 Claims. (Cl. 330—31)

This invention relates to amplitude equalizers and more particularly to adjustable attenuation equalizers.

In the transmission and processing of electrical signals especially audio frequency signals it often happens that due to the characteristics of the transmission equipment or of the lines that the higher audio frequencies are attenuated more than are the lower audio frequencies thus causing distortion. Distortion is objectionable and audio signals distorted in this manner may not be useful in this form. Further processing of the signal at the receiving end of the transmission path must be provided to compensate for the distortion introduced by the transmitting equipment and transmission path. It is therefore an object of this invention to provide means which will compensate for variations in the relative amplitudes of a received intelligence signal which have been introduced by the transmitting equipment or by the transmission path. A further object of the invention is to provide means which will compensate for known variations from true frequency response in a transmission system. Accordingly, a feature of this invention relates to impedance isolating means which may be inserted in the path of an audio frequency signal so that further means may be used to operate on this signal without reflecting these changes into the circuitry coming before the impedance isolating means. Another feature of this invention comprises impedance means, i.e., compensating circuit, which are inserted in the signal path after the impedance isolating means which operate on the signal over particular frequency ranges to compensate for variations from the true frequency response which have been introduced by the transmission path.

According to the present invention, impedance isolating means comprising a transistor in emitter follower configuration may be used as the impedance isolating means. As an impedance isolating means the emitter follower transistor configuration has the advantage of a low output impedance and a high input impedance; which enables a substantially higher impedance to be coupled into the base of the emitter follower and a substantially lower impedance to be connected at the output than would be possible in other types of isolating means. After the impedance isolating means, impedance means, i.e., compensating circuit, and attenuation means are inserted in the signal path. These include an anti-resonant RLC circuit with each of the elements of the circuit being variable for convenience. In addition there are resistive attenuation means. The signal input to the emitter follower is transferred to the output with a gain near unity; the emitter follower by nature has a gain less than unity. The signal then passes through the anti-resonant circuit and the attenuation means without being substantially changed except over a certain frequency range where it is desired to affect the transmitted signal. This small frequency range over which the transmitted signal is substantially affected by the compensating circuit impedance and attenuation means is determined by the frequency characteristic of the anti-resonant circuit, that is the magnitude of inductance and capacitance of this circuit. The bandwidth over which the transmitted signal is substantially affected is determined by the resistance element of the anti-resonant circuit. Over the particular frequency range in which the anti-resonant circuit is intended to operate it will appear as a large impedance between the emitter output signal and a common reference point. During the time when the anti-resonant circuit is not operating on the transmitted signal, the anti-resonant combination appears as a very low impedance to the output of the emitter follower and therefore has little effect on the transmitted signal.

A better understanding of this invention will be had by reference to the following figures in which.

Figure 3:
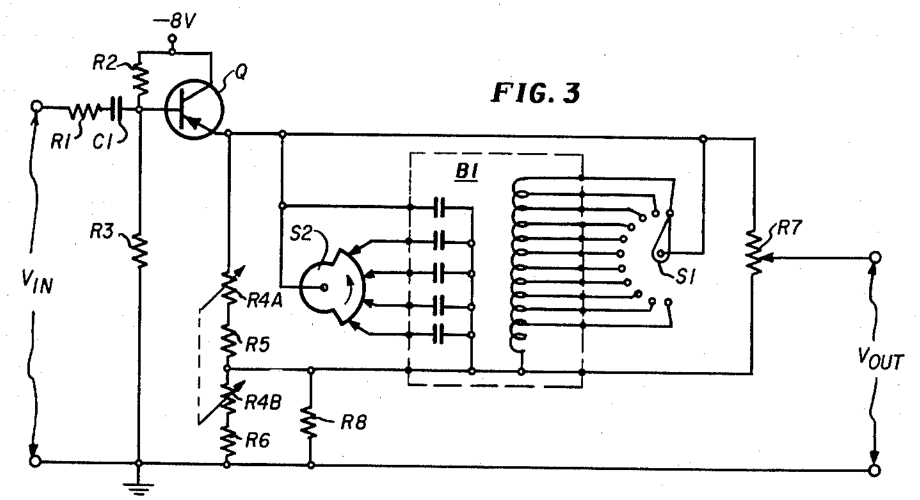
FIG. 3 is a schematic representation of an embodiment of the invention which shows how the inductance and capacitance of the anti-resonant circuit may be adjusted.
Figure 5:
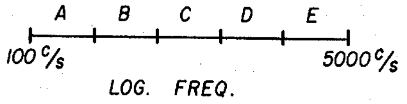
Figure 6:
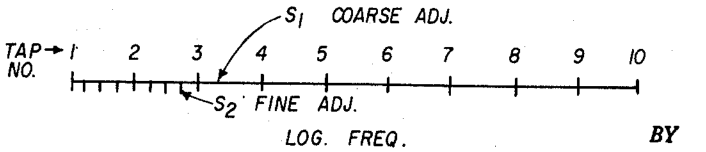

FIG. 5 indicates how part of the audio frequency range may be divided so that several attenuation equalizers may be used to operate on the transmitted signal in the different frequency ranges;

FIG. 6 is useful to show how the adjustable inductance and capacitance of FIG. 3 may be used to obtain an accurate center frequency for the anti-resonant circuit.

Figure 1:
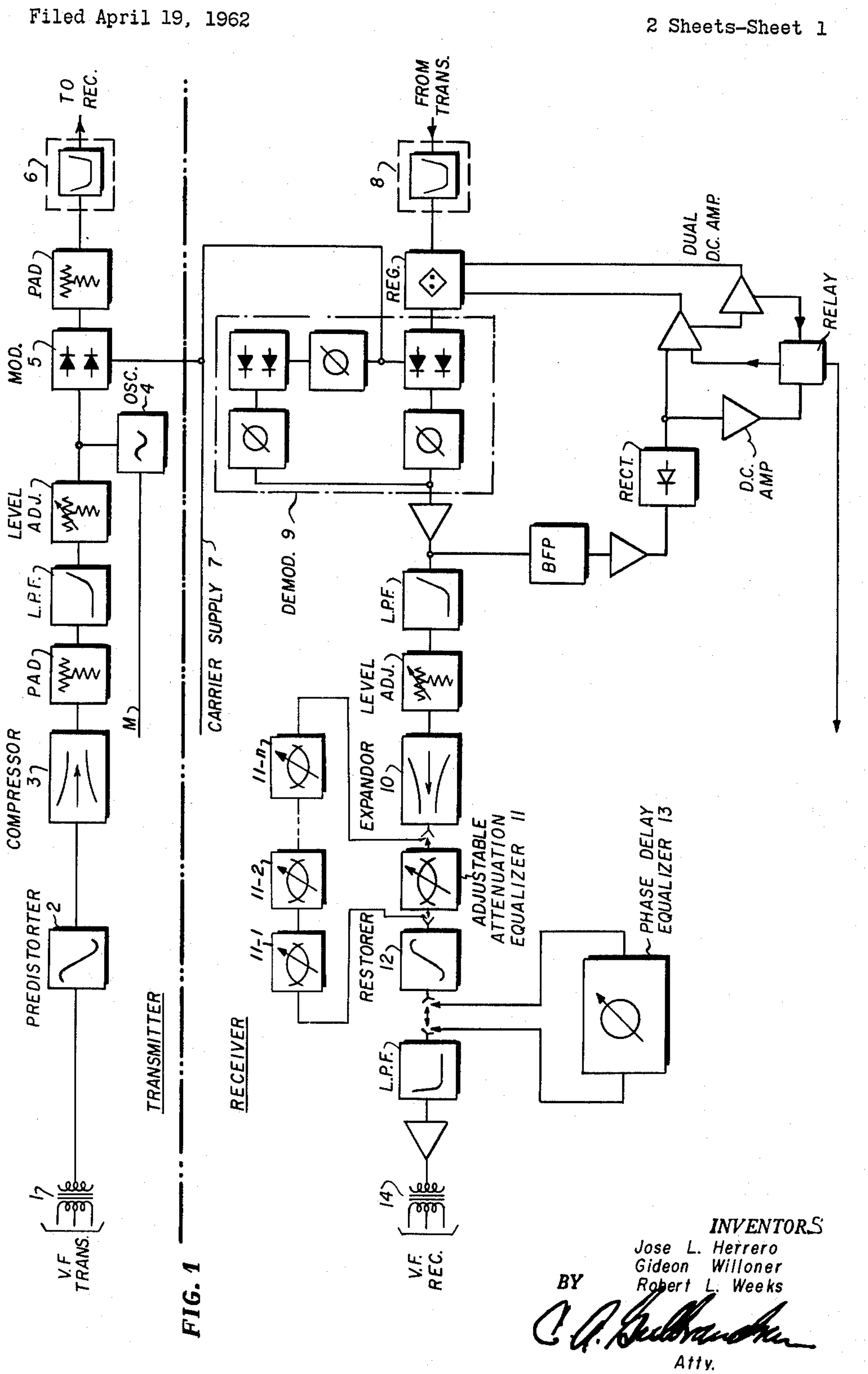
FIG. 1 is a schematic representation of a transmission system with which the present invention may be used.

FIGURE 1 is a schematic diagram of channel equipment for a carrier communications system including transmitting and receiving means. The particular carrier system shown includes a source of voice frequency signals 1, coding means 2, compounding means 3, local oscillator 4, modulating means 5, coding means 6 and a source of carrier current 7 which is common for the transmitter and receiver. The receiving means shown in FIG. 1 includes coding means 8, demodulating means 9, expanding means 10, the attenuation equalizer 11 which is the subject of the present application, decoding means 12, phase delay equalizer 13 and voice frequency receiving means 14. The purpose of the attenuation equalizer is to eliminate variations from true frequency response caused by other elements of the transmission system. The purpose of the phase delay equalizer is to compensate for variations in delay time which is not constant for all frequencies through the transmission systems.

Figure 2:
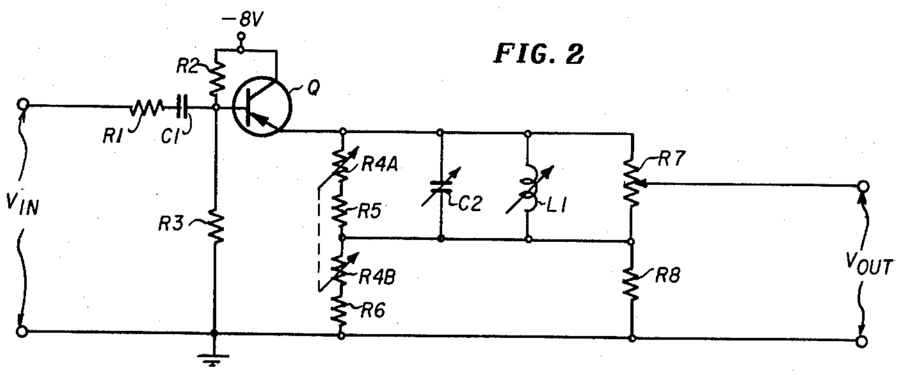
FIG. 2 is a schematic representation of an embodiment of the invention.

Referring to FIG. 2, the audio frequency input signal is applied to the base of transitsor Q through resistor R1 and capacitance C1. Resistors R2 and R3 are chosen for desired emitter follower biasing. The anti-resonant circuit, comprising variable resistor R4A resistor R5 variable capacitance C2 and variable inductance L1, is connected to the emitter output of transistor Q. The anti-resonant circuit is also connected to an attenuator comprising variable resisor R7 and resistor R8. Variable resistance R4B is equal to and interconnected with resistance R4A and resistance R5 equals resistance R6. Resistances R4A and R4B are equal and interconnected so that the bandwidth of the anti-resonant circuit may be adjusted after the attenuator has been set for a desired output level without changing the output voltage of the attenuation means.

The input signal appearing on the base of transistor Q also appears on the emitter output of transistor Q with the gain of nearly unity. In the frequency range for which the anti-resonant circuit is not operative most of the voltage appearing on the emitter lead of transistor Q is transferred through the low impedance anti-resonant circuit and developed across resistor R8. Under these conditions the setting of resistor R7 is of no consequence since no voltage is developed across resistor R7. Over the frequency range for which the anti-resonant circuit is adjusted to operate, voltage is developed across the anti-resonant circuit since it is then at a high impedance and therefore across resistance R7 and R8 the signal amplitude of the frequency range over which the anti-resonant circuit is operative may be adjusted by varying resistance R7. The frequency range over which the anti-resonant circuit is operative may be adjusted by varying R4A. Note that varying resistance R4A will not change the level of output voltage as determined by the setting of resistance R7 because resistance R4B is interconnected with R4A so that the division of voltage across resistance R4A and R5 and resistance R4B and R6 remains constant as resistance R4A is varied.

Figure 4:
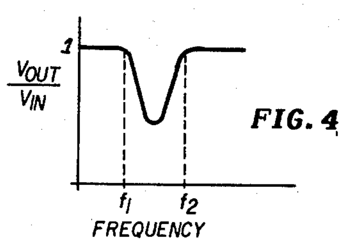
FIG. 4 is a representation of the frequency response of the circuit which is useful in explaining its operation.

In FIGURE 4 the output voltage, V out, of the attenuation equalizer divided by the input voltage, V in, to the emitter follower section is plotted versus frequency. Over most of the frequency range the V out over V in is nearly unity which is the gain of the emitter follower transistor, but in the range of frequency between F1 and F2 of FIGURE 4 voltage is developed across the anti-resonant circuit and resistance R7 so that attenuation takes place in this range of frequencies which decreases the gain below the near unity level. Substantial equalization of amplitude between frequencies $f1$ and $f2$ is achieved by attenuating all frequencies within the $f1$ and $f2$ boundary at a different degree with respect to each other which is in accordance with the selectivity response of the anti-resonant circuit as is exemplified in FIGURE 4.

FIGURE 3 is the same as FIGURE 2 with the exception that the inductance and capacitance of the anti-resonant circuit are indicated to be variable by changing the position of the rotary switch S1 thereby changing the inductance and by moving the sliding switch S2 thereby varying the capacitance of the anti-resonant circuit. As indicated in FIG. 3 the capacitors and inductors of the anti-resonant circuit may be mounted on a removable board so that the operational frequency and the attenuation equalizer may be changed by merely removing the board B1 and replacing it with another having different values of inductance and capacitance mounted on it.

FIGURE 5 shows how the audio frequency range up to 5,000 cycles per second might be divided into five logarithmically equi-distant frequency ranges; each served by an adjustable attenuator equalizer differing only in the values of the frequency determining components L and C. Several such attenuation equalizers designated as 11–1, 11–2, . . . **11–*n*** in FIG. 1, which are operating in different frequency ranges, may be used in series to correct for variations from true frequency response caused by the transmission equipment. With reference to FIG. 5, five attenuation equalizers would be necessary to compensate for changes in the five ranges shown therein. A manual switch arrangement illustrated in FIG. 3 could also be used whereby each position of the switch could be an equalizer corresponding to one of said five frequency ranges.

FIG. 6 indicates how the switches S1 and S2 may be used to obtain an accurate center frequency for a particular attenuation equalizer. Switch S1 which varies the inductance in the circuit is first used as a course frequency adjustment and then switch S2 which varies the capacitance in the circuit is used to obtain fine frequency adjustment for the attenuation equalizer.

While I have described above the principles of my invention in connection with specific apparatus, it is to be clearly understood that this description is made only by way of example and not as a limitation to the scope of my invention.

What is claimed is:

1. An equalizer circuit in combination comprising:
an input circuit and output circuit;
circuit connections for connecting signals to said input;
an impedance isolating circuit connected to said input;
a compensating circuit interposed betwen said isolating circuit and said output circuit for adjusting the amplitude signal level for a particular range of frequencies in accordance with the frequency response of said compensating circuit;
said impedance isolating circuit including an impedance means connected to said compensating circuit for varying the frequency range and selectivity of said compensating circuit;
and amplitude varying means connected between said compensating means and said output, whereby the amplitude of said range of frequencies may be varied without affecting the amplitude of signals outside of said range.

2. An equalizer circuit comprising:
an input circuit and output circuit;
circuit connections for connecting signals to said input;
an impedance isolating circuit including an emitter follower connected to said input;
an anti-resonant circuit interposed between said emitter follower and said output circuit for adjusting the amplitude signal level for a particular range of frequencies in accordance with the frequency response of said anti-resonant circuit;
said emitter follower including impedance means connected to said anti-resonant circuit for varying the frequency range and selectivity of said anti-resonant circuit;
and amplitude varying means connected between anti-reasonant means and said output, whereby the amplitude of said range of frequencies may be varied without affecting the amplitude of signals outside of said range.

3. An equalizing circuit comprising:
an input circuit and output circuit;
circuit connections for connecting signals to said input;
an impedance isolating circuit including an emitter follower connected to said input;
an anti-resonant circuit interposed between said emitter follower and said output circuit for adjusting the amplitude signal level for a particular range of frequencies in accordance with the frequency response of said anti-resonant circuit;
said emitter follower including an impedance means comprising a first section and a second section;
said first section including a first variable impedance device connected to said anti-resonant circuit for varying the frequency range and selectivity of said anti-resonant circuit;
said second section including a second impedance varying device connected to said first section and ganged with said first variable impedance device so that a change of adjustment of said first variable impedance device will in turn cause a corresponding change of adjustment of said second variable impedance so as to permit adjusting of the frequency range and selectivity of said anti-resonant circuit without substantially affecting the amplitude of said particular range of frequencies,
and amplitude varying means connected between said anti-resonant circuit and said output, whereby the amplitude of said range of frequencies may be varied without affecting the amplitude of signals outside of said range.

4. In a transmission system,
a plurality of equalizer circuits connected in series, and each varying a different particular range of frequencies without substantially affecting signals outside of said particular frequencies;
each of said equalizing circuits comprising:
an input circuit and output circuit;
circuit connections for connecting signals to said input;
an impedance isolating circuit connected to said input;
a compensating circuit interposed between said isolating circuit and said output circuit for adjusting the amplitude signal level for a particular range of frequencies in accordance with the frequency response of said compensating circuit;

said impedance isolating circuit including an impedance means connected to said compensating circuit for varying the frequency range and selectivity of said compensating circuit;

and amplitude varying means connected between said compensating means and said output, whereby the amplitude of said range of frequencies may be varied without affecting the amplitude of signals outside of said range.

5. In a transmission system, a plurality of equalizer circuits as claimed in claim 4, wherein said compensating circuits for each of said equalizing circuits are anti-resonant circuits whose anti-resonant frequencies are logarithmically equi-distant apart.

References Cited by the Examiner

UNITED STATES PATENTS

| | | | |
|---|---|---|---|
| 2,480,205 | 8/49 | Wallman | 330—154 |
| 2,934,711 | 4/60 | Dawson | 330—193 |
| 2,994,835 | 8/61 | McCoy | 330—172 |

ROY LAKE, *Primary Examiner.*

NATHAN KAUFMAN, *Examiner.*